(12) United States Patent
Englehart

(10) Patent No.: US 8,924,925 B2
(45) Date of Patent: *Dec. 30, 2014

(54) SYSTEMS AND METHODS FOR MODELING EXECUTION BEHAVIOR

(71) Applicant: The MathWorks, Inc., Natick, MA (US)

(72) Inventor: Matthew J. Englehart, Olmstead Township, OH (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,028

(22) Filed: Mar. 21, 2014

(65) Prior Publication Data

US 2014/0208289 A1   Jul. 24, 2014

Related U.S. Application Data

(63) Continuation of application No. 11/170,305, filed on Jun. 28, 2005, now Pat. No. 8,683,426.

(51) Int. Cl.
*G06F 9/44* (2006.01)
*G06F 9/45* (2006.01)
*G06F 9/455* (2006.01)
*G05B 13/02* (2006.01)

(52) U.S. Cl.
CPC ... *G06F 8/34* (2013.01); *G06F 8/10* (2013.01)
USPC ............ 717/105; 703/22; 717/109; 717/113; 717/135; 700/29; 716/106

(58) Field of Classification Search
USPC .................. 717/105, 109, 113, 135; 716/106
See application file for complete search history.

(56) References Cited

U.S. PATENT DOCUMENTS

| 5,286,907 | A | 2/1994 | Okamura et al. |
| 5,465,240 | A | 11/1995 | Mankovitz |

(Continued)

FOREIGN PATENT DOCUMENTS

| CN | 1275035 | 11/2000 |
| EP | 0242131 | 3/1995 |

(Continued)

OTHER PUBLICATIONS

The MathWorks, Inc. "Using Simulink, Version 5", Revised for Simulink 5.1 (Release 13SP1), Sep. 2003.

(Continued)

*Primary Examiner* — Ryan Coyer
(74) *Attorney, Agent, or Firm* — Harrity & Harrity, LLP

(57) ABSTRACT

A mechanism in a block diagram environment allows the modeling of an execution behavior of a block in a block diagram, where a user selects the execution behavior from a plurality of functions related to the block diagram and where the execution behavior of the block is performed when at least one model variable associated with the block satisfies a user-specified condition is disclosed. States and other internal data in the designated block are initialized upon the satisfaction of the user-specified condition. The illustrative embodiment of the present invention also allows the internal data to be reset upon the ending of the event, such as the modeled introduction or withdrawal of power. The execution behavior may be suspended and resumed multiple times during the simulation in response to multiple occurrences of the specified event. The present invention also allows for selected data to be exempt from the reset process so that the selected data is non-volatile.

20 Claims, 16 Drawing Sheets

(56) References Cited

U.S. PATENT DOCUMENTS

| | | | |
|---|---|---|---|
| 5,497,500 | A | 3/1996 | Rogers et al. |
| 5,635,657 | A | 6/1997 | Lee et al. |
| 5,768,396 | A | 6/1998 | Sone |
| 5,821,934 | A | 10/1998 | Kodosky et al. |
| 5,850,548 | A | 12/1998 | Williams |
| 5,902,115 | A | 5/1999 | Katayama |
| 5,980,262 | A | 11/1999 | Tseng et al. |
| 6,117,626 | A | 9/2000 | Yamane et al. |
| 6,338,143 | B1* | 1/2002 | Shimazaki .............. 713/340 |
| 6,490,715 | B1* | 12/2002 | Moriwaki et al. ........ 716/108 |
| 6,526,566 | B1 | 2/2003 | Austin |
| 6,802,053 | B1 | 10/2004 | Dye et al. |
| 6,961,913 | B1* | 11/2005 | Okazaki et al. .......... 716/102 |
| 7,024,660 | B2* | 4/2006 | Andrade et al. .......... 717/124 |
| 7,299,383 | B2 | 11/2007 | David et al. |
| 7,299,458 | B2 | 11/2007 | Hammes |
| 7,370,293 | B2* | 5/2008 | Yamagata ................ 716/102 |
| 7,487,418 | B2 | 2/2009 | Kayukawa et al. |
| 7,490,341 | B2 | 2/2009 | Kiiskinen et al. |
| 7,774,728 | B2 | 8/2010 | Frenkil |
| 8,458,655 | B1 | 6/2013 | Linebarger et al. |
| 8,683,426 | B2 | 3/2014 | Englehart |
| 2002/0034306 | A1 | 3/2002 | Owada et al. |
| 2002/0077800 | A1 | 6/2002 | Kampe |
| 2003/0177014 | A1 | 9/2003 | Crawford et al. |
| 2004/0102860 | A1 | 5/2004 | Lai et al. |
| 2004/0111614 | A1 | 6/2004 | Yamada |
| 2004/0144236 | A1 | 7/2004 | Hiratsuka |
| 2004/0205507 | A1 | 10/2004 | Tuschner et al. |
| 2004/0210592 | A1 | 10/2004 | Ciolfi et al. |
| 2004/0242207 | A1 | 12/2004 | Chi |
| 2005/0039162 | A1 | 2/2005 | Cifra |
| 2005/0109195 | A1 | 5/2005 | Haruyama et al. |
| 2005/0126371 | A1 | 6/2005 | Kodama et al. |
| 2005/0177816 | A1 | 8/2005 | Kudukoli et al. |
| 2005/0185547 | A1 | 8/2005 | Nagai et al. |
| 2005/0204317 | A1 | 9/2005 | Yamagata |
| 2005/0235253 | A1 | 10/2005 | Petersen et al. |
| 2006/0199161 | A1 | 9/2006 | Huang |
| 2006/0294369 | A1 | 12/2006 | Matsushima et al. |
| 2007/0157138 | A1 | 7/2007 | Ciolfi et al. |
| 2008/0026355 | A1 | 1/2008 | Petef |
| 2008/0034300 | A1 | 2/2008 | Shah et al. |
| 2008/0079591 | A1 | 4/2008 | Chow |

FOREIGN PATENT DOCUMENTS

| | | |
|---|---|---|
| GB | 2272314 | 5/1994 |
| TW | 200522740 | 7/2005 |
| TW | I261183 | 9/2006 |

OTHER PUBLICATIONS

Gheorghiu, Victor et al., "Model of a Supercharged Diesel Engine with High and Low-Pressue EGR as Part of an NMPC for ECU Implementation," SAE 2007-24-0084, 18 pages, (2007).

Grunske, Lars et al., "Model-Driven Safety Evaluation with State-Event-Based Component Failure Annotations," CBSE 2005, LNCS 3489, G.T. Heineman (Ed.), pp. 33-48, (2005).

Maldonado, Yazmin et al., "Design and Simulation of the Fuzzification Stage through the Xilinx System Generator," Soft Computing for Hybrid Intel. Systems, SCI 154, O. Castillo (Ed.), Springer-Verlag, Berlin, Heidelberg, pp. 297-305, (2008).

International Preliminary Report on Patentability for Application No. PCT/US2006/025238, 11 pages, dated Mar. 13, 2008.

Taiwan Office Action for Application No. 095142540, 5 pages, dated May 19, 1999.

Buck, Joseph et al., "Heterogeneous Modeling and Simulation of Embedded Systems in El Greco," *Proceedings of the Eigth International Symposium on Hardware/Software Codesign*, pp. 142-146 (2000).

de Niz, Dionisio et al., "Time Weaver: A Software-Through-Models Framework for Embedded Real-Time Systems," *Proceedings of the 2003 ACM SIGPLAN conference on Language, compiler, and tool support for embedded systems*, vol. 38(7):133-143 (2003).

Douglass, Bruce Powel, "Object Orientation with UML 2.0—Dynamic Aspects," *Real Time UML*, Third Edition, Addison-Wesley, Chpt. 3, pp. 139-143 (2004).

Grimshaw, Andrew S. et al., "MENTAT: An Object-Oriented Macro Data Flow System," *OOPSLA '87 Proceedings*, vol. 22(12):35-47 (1987).

Harel, David et al., "The STATEMATE Semantics of Statecharts," *ACM Transactions on Software Engineering and Methodology*, vol. 5(4):293-333 (1996).

International Search Report for Application No. PCT/US2006/025238, dated Aug. 1, 2007.

Invitation to Pay Additional Fees for Application No. PCT/US2006/025238, dated Dec. 22, 2006.

Börger, Egon et al., "Modeling the Dynamics of UML State Machines," Proceedings, ASM International Workshop, Theory and Applications, vol. 1912 of LNCS, 19 pages (2000).

\* cited by examiner

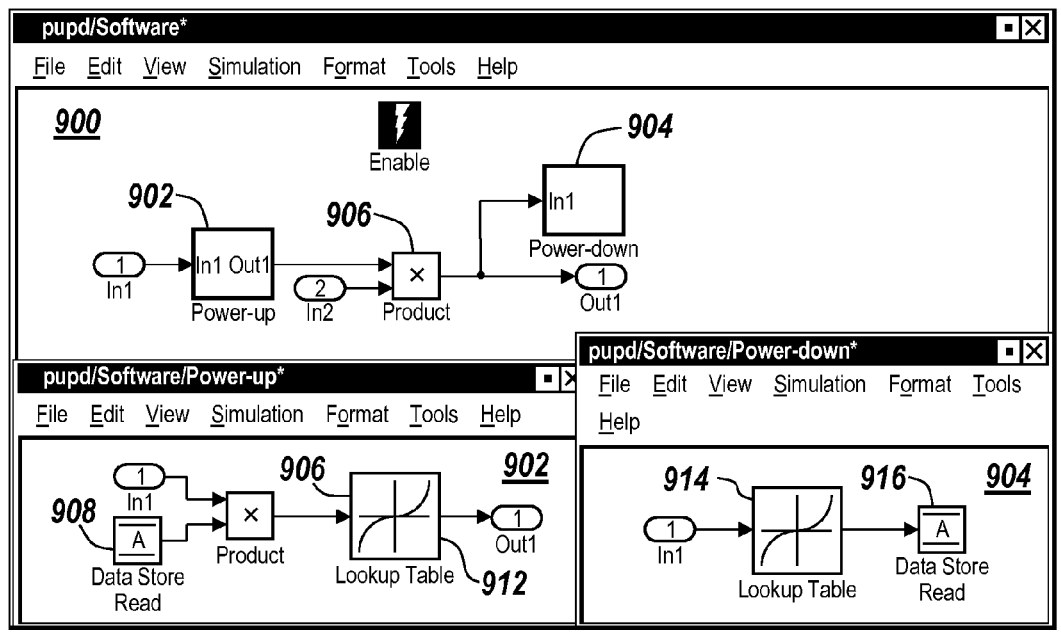

Fig. 9

```
1    detectPowerState(powerSignal, currentPowerMode) {
2        switch(currentPowerMode) {
3            case POWERED_DOWN:
4                if (powerSignal) return POWERING_UP;
5                break;
6            case POWERED_UP:
7                if (!powerSignal) return POWERING_DOWN;
8                break;
9        }
10       return currentPowerMode;
11   }
```

```
1    /* switch based on power signal and current power mode */
2    switch (detectPowerState(powerSignal, currentPowerMode)) {
3        case POWERING_UP:
4            /* Execute Power-up system when powering up*/
5            temp = lookup1D(In1*A);
6            /* Transition to a powered-up state */
7            currentPowerMode = POWERED_UP;
8            /*FALLTHROUGH*/
9
10       case POWERED_UP:
11           Out1 = temp * In2;
12           break;
13
14       case POWERING_DOWN:
15           /* Execute Power-down system and update data store when powering down */
16           A = lookup1D(Out1);
17           /* Reset outputs of PUPD system as it powers down */
18           Out1 = 0;
19           /* Transition to a powered-down state */
20           currentPowerMode = POWERED_DOWN;
21           /*FALLTHROUGH*/
22
23       case POWERED_DOWN:
24           /* no action required while system is powered down */
25           break;
26   }
```

Fig. 10

```
 1  detectEnableState(enableSignal, currentEnableMode) {
 2      switch(currentEnableMode) {
 3          case DISABLED:
 4              if (enableSignal) return BECOMING_ENABLED;
 5              break;
 6          case ENABLED:
 7              if (!enableSignal) return BECOMING_DISABLED;
 8              break;
 9      }
10      return currentEnableMode;
11  }
```

```
 1  /* At time 0 initialize all nonvolatile states in the hierarchy */
 2  if (time == 0) {
 3    NonvolatileDelay1_DSTATE = 5.0;
 4    NonvolatileDelay2_DSTATE = 8.0;
 5  }
 6
 7  /* switch based on power signal and current power mode */
 8  switch (detectPowerState(power, Software_MODE) {
 9
10    case POWERING_UP:
11      pupd2_DWork.Software_MODE = POWERED_UP;
12      /* When powering up, initialize all volatile states in the hierarchy */
13      VolatileDelay1_DSTATE = 2.0;
14      VolatileDelay2_DSTATE = 4.0;
15      /*FALLTHROUGH*/
16
17    case POWERED_UP:
18      /* switch on enable state for enable system: 'Reset Subsystem' */
19      switch (detectEnableState(In1 > 0.0, ResetSubsystem_MODE) {
20
21        case BECOMING_ENABLED:
22          /* Initialize the volatile state in this portion of the hierarchy */
23          VolatileDelay1_DSTATE = 2.0;
24          ResetSubsystem_MODE = SUBSYS_ENABLED;
25          /*FALLTHROUGH*/
26        case ENABLED:
27          Out1 = VolatileDelay1_DSTATE;
28          Out2 = NonolatileDelay1_DSTATE;
29          VolatileDelay1_DSTATE = In1;
30          NonvolatileDelay1_DSTATE = In2;
31          break;
32        case BECOMING_DISABLED:
33          ResetSubsystem_MODE = SUBSYS_DISABLED;
34          /*FALLTHROUGH*/
35        case DISABLED:
36          break;
37      }
38
39      /* Output and update for enable system: 'Held Subsystem' */
40      if(pupd2_U.In3 > 0.0) {
41        Out3 = VolatileDelay2_DSTATE;
42        Out4 = NonvolatileDelay2_DSTATE;
43        VolatileDelay2_DSTATE = In3;
44        NonvolatileDelay2_DSTATE = In4;
45      }
46      break;
47
48    case POWERING_DOWN:
49      ResetSubsystem_MODE = SUBSYS_DISABLED;
50      /* Reset PUPD outputs
51      Out3 = 0.0;
52      Out4 = 0.0;
53      /* When powering down, reset all volatile states in the hierarchy */
54      VolatileDelay1_DSTATE = 0.0;
55      VolatileDelay2_DSTATE = 0.0;
56      Software_MODE = POWERED_DOWN;
57      /*FALLTHROUGH*/
58
59    case POWERED_DOWN:
60      break;
61  }
```

*Fig. 12*

```
1   /* Initialize nonvolatile memory independent of PUPD system */
2   if (time == 0) {
3      powercycles = 0;     1810
4   }
5
6   /* switch on PUPD state */
7   switch (detectPowerState(power, Software_MODE)) {
8     case POWERING_UP:
9        pupd4_DWork.EmbeddedMATLABFunction.state_not_empty = false;
10       Software_MODE = (int_T) POWERED_UP;
11       /*FALLTHROUGH*/
12
13    case POWERED_UP:
14       if (!state_not_empty) {
15          powercycles = powercycles + 1;
16          state = 0;
17          state_not_empty = true;
18       }
19       output = 0;
20       if (state == 0) {
21          if (In1 > 0.5) {
22             state = 1;
23             output = 1;
24             state_not_empty = true;
25          } else {
26             output = -1;
27          }
28       } else {
29          if (In1 < -0.5) {
30             state = 0;
31             output = -1;
32             state_not_empty = true;
33          } else {
34             output = 1;
35          }
36       }
37       break;
38
39    case POWERING_DOWN:
40       output = 0;
41       Software_MODE = (int_T) SUBSYS_DISABLED;
42       /*FALLTHROUGH*/
43
44    case SUBSYS_DISABLED:
45       break;
46   }
```

*Fig. 18*

```
1   /* Initialize nonvolatile memory at the start of simulation */
2   if (startOfSimulation) {
3      NonvolatileDelay_Memory = 5.0;
4   }
5
6   /* switch based on power signal and current power mode */
7   switch (detectPowerState(powerSignal, currentPowerMode)) {
8    case POWERING_UP:
9      /* Initialization of volatile each time system powers up */
10     VolatileDelay_Memory = 2.0;
11     /* Transition to a powered-up state */
12     currentPowerMode = POWERED_UP;
13     /*FALLTHROUGH*/
14
15   case POWERED_UP:
16     /* Execute primary system semantics */
17     VolatileDelay_Output = VolatileDelay_Memory;
18     NonvolatileDelay_Output = NonvolatileDelay_Memory;
19     VolatileDelay_Memory = VolatileDelay_Input;
20     NonvolatileDelay_Memory = NonvolatileDelay_Input;
21     break;
22
23   case POWERING_DOWN:
24     /* Reset outputs of PUPD system as it powers down */
25     VolatileDelay_Output = 0.0;
26     NonvolatileDelay_Output = 0.0;
27     /* Reset volatile states of PUPD system as it powers down */
28     VolatileDelay_Memory = 0.0;
29     /* Transition to a powered-down state */
30     currentPowerMode = POWERED_DOWN;
31     /*FALLTHROUGH*/
32
33   case POWERED_DOWN:
34     /* no action required while system is powered down */
35     break;
36  }
```

*Fig. 21*

```
1   detectPowerState(powerSignal, currentPowerMode) {
2       switch(currentPowerMode) {
3           case POWERED_DOWN:
4               if (powerSignal) return POWERING_UP;
5               break;
6           case POWERED_UP:
7               if (!powerSignal) return POWERING_DOWN;
8               break;
9       }
10      return currentPowerMode;
11  }
```

*Fig. 22*

```
1   /* initialize volatile memory at time 0 */
2   if (time = 0) {
3       VolatileDelay_Memory = 2.0;
4   }
5   VolatileDelay_Output = VolatileDelay_Memory;
6   NonvolatileDelay_Output = NonvolatileDelay_Memory;
7   VolatileDelay_DSTATE = VolatileDelay_Input;
8   NonvolatileDelay_DSTATE = NonvolatileDelay_Input;
```

*Fig. 23*

SYSTEMS AND METHODS FOR MODELING EXECUTION BEHAVIOR

RELATED APPLICATION

This application is a continuation of U.S. patent application Ser. No. 11/170,305, filed Jun. 28, 2005, (now U.S. Pat. No. 8,683,426) the disclosure of which is incorporated by reference herein in its entirety.

FIELD OF THE INVENTION

The present invention relates to a system and method for modeling behavior, and, in particular, for modeling execution behavior of a component in a block diagram environment.

BACKGROUND

Various classes of graphical models describe computations that can be performed on application specific computational hardware, such as a computer, microcontroller, FPGA, and custom hardware. Classes of such graphical models may include time-based block diagrams such as those found within Simulink® from The MathWorks, Inc. of Natick, Mass., state-based and flow diagrams such as those found within Stateflow® from The MathWorks, Inc. of Natick, Mass., physical models such as those found within SimMechanics from The MathWorks, Inc. of Natick, Mass., discrete-event based diagrams, data-flow diagrams, and software diagrams such as those within the Unified Modeling Language (UML). A common characteristic among these various forms of graphical models is that they define semantics on how to interpret or execute the model.

Block diagrams are graphical entities having an "executable meaning" that are created within graphical modeling environments for modeling a dynamic system, and generally comprise one or more graphical objects. For example, a block diagram model of a dynamic system is represented schematically as a first collection of graphical objects, such as nodes, that are interconnected by another set of graphical objects, generally illustrated as lines, which represent logical connections between the first collection of graphical objects. In most block diagramming paradigms, the nodes are referred to as "blocks" and drawn using some form of geometric object (e.g., circle, rectangle, etc.). The line segments are often referred to as "signals." Signals correspond to the time-varying quantities represented by each line connection and are assumed to have values at each time instant. Each node may represent an elemental dynamic system, and the relationships between signals and state variables are defined by sets of equations represented by the nodes. Inherent in the definition of the relationship between the signals and the state variables is the notion of parameters, which are the coefficients of the equations. These equations define a relationship between the input signals, output signals, state, and time, so that each line represents the input and/or output of an associated elemental dynamic system. A line emanating at one node and terminating at another signifies that the output of the first node is an input to the second node. Each distinct input or output on a node is referred to as a port. The source node of a signal writes to the signal at a given time instant when its system equations are solved. The destination nodes of this signal read from the signal when their system equations are being solved. Those skilled in the art will recognize that the term "nodes" does not refer exclusively to elemental dynamic systems but may also include other modeling elements that aid in readability and modularity of block diagrams.

Dynamic systems are typically modeled as sets of differential, difference, and/or algebraic equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, a parameter is the length of the pendulum; for the filter example, a parameter is the values of the filter taps.

Unfortunately, conventional environments typically lack a method for a user to select execution behavior to be performed, or to specify a condition to be satisfied prior to the performance of execution behavior, as opposed to evaluating the methods of the block during the initialization of the model during the link stage. Additionally, conventional simulation environments typically lack a method for specifying that, when a power cycle is modeled, setup or termination methods should execute upon introducing or withdrawing the modeled power supply, respectively, or alternatively, that there should be an exemption from any termination methods.

SUMMARY OF THE INVENTION

The illustrative embodiment of the present invention allows the modeling of execution behavior of a block in a block diagram, and evaluation of methods of designated subsystem blocks to be controlled by events that are defined by conditions that are functions of at least one model variable, such as the modeled delivery of power to a subsystem block. Upon the occurrence of the specified event, block setup methods may execute, including initialization of states, other internal data in the designated block, and associated hardware. The illustrative embodiment of the present invention also allows the evaluation of termination methods of designated subsystem blocks to be delayed until the occurrence of a specified event, such as the modeled withdrawal of power from a subsystem block. The setup or termination methods may be executed multiple times during the simulation in response to multiple occurrences of the specified event. The present invention also allows for selected data to be exempt from the reset process when the modeled power is withdrawn so that the selected data is non-volatile. More generally, the present invention enables state reset and initialization to be part of an initialization hierarchy that is independent of the model decomposition hierarchy but that could be directly related to it.

In one embodiment of the present invention, a method for modeling execution behavior of a component in a block diagram includes the step of providing a block in the block diagram. The block has an execution behavior that is selected by a user and that is performed when at least one model variable associated with the block satisfies a user-specified condition, where the at least one execution behavior is chosen from a plurality of functions related to the block diagram. The method also includes the step of performing the execution behavior of the block upon satisfaction of the user-specified condition by the at least one model variable associated with the block.

In another embodiment of the present invention, a method for modeling execution behavior of a component in a block diagram includes the step of providing a block in the block diagram. The block has an execution behavior that is performed when a condition on at least one model variable associated with the block is satisfied, the behavior modeling power up and power down effects. The method further includes the step of performing the execution behavior of the block upon at least one model variable associated with the block satisfying a condition.

In an embodiment of the present invention in a block diagram environment, a system includes a block. The block has execution behavior that is performed when a condition on at least one model variable associated with the block is satisfied. The system also includes a server. The server receives information about the block and generates a block diagram responsive to the received information.

In another embodiment of the present invention a method for modeling execution behavior of a component in a block diagram includes the step of providing a block in a block diagram, wherein the block has at least one execution behavior that is performed when a condition on at least one model variable associated with the block is satisfied, modeling power being removed from the at least model variable associated with the block. The method also includes the step of performing at least one execution behavior of the block upon a modeled removal of power from the at least one model variable associated with the block through the satisfaction of a condition by at least one model variable associated with the block.

In another embodiment, in a block diagram environment, a system includes a block having at least one execution behavior that is performed when a condition on at least one model variable associated with the block is satisfied, modeling withdrawing power from the block. The system also includes a server that receives information about the block and generates a block diagram responsive to the received information.

In an embodiment of the present invention, a method of modeling a block with a nonvolatile state includes the step of providing a block representing the block with the nonvolatile state. The method also includes the steps of storing an internal state of the block and suspending the execution of the block upon a modeled removal of power from the block. The method additionally includes the step of preserving the internal state of the block after suspension of the execution of the block. The method additionally includes the steps of resuming execution of the block upon a subsequent modeled introduction of power to the block, and subsequently using the preserved internal state to initialize an internal state of the block.

In another embodiment of the present invention in a block diagram environment, a system for modeling a nonvolatile block includes a server. The server stores an internal state of a modeled nonvolatile component, and preserves the internal state of the component after suspending modeling of the nonvolatile component. The server also uses the preserved internal state to initialize an internal state of the block.

BRIEF DESCRIPTION OF THE DRAWINGS

These and other aspects of this invention will be readily apparent from the detailed description below and the appended drawings, which are meant to illustrate and not to limit the invention, and in which:

FIG. 9 is a block diagram depicting one embodiment of a system containing a power up and power down subsystem;

FIG. 10 is a code fragment depicting one embodiment of code generated for a system containing power up and power down subsystems;

FIG. 12 depicts one embodiment of code for an accelerated simulation of the system 1100;

FIG. 18 depicts one embodiment of code generated for an embedded MATLAB environment in which a variable has a nonvolatile value;

FIG. 21 depicts one embodiment of generated code for simulation of a system in the present invention;

FIG. 22 depicts one embodiment of code used to detect transitions from a powered down state to a powered up state; and FIG. 23 depicts one embodiment of code generated independent of any software environment.

DETAILED DESCRIPTION OF THE INVENTION

Figure 1A:
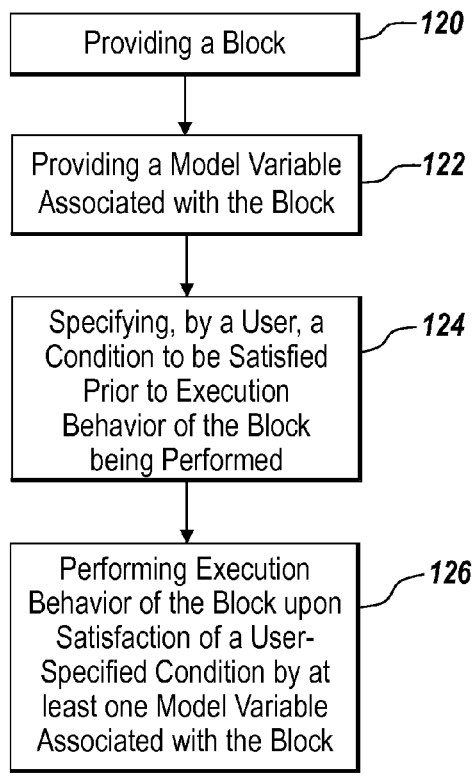
FIG. 1A is a flow diagram depicting one embodiment of steps taken in a method for modeling execution behavior of a component in a block diagram.

The illustrative embodiment of the present invention provides support for modeling execution behavior of a component in a block diagram environment. When an execution environment is notified that at least one model variable associated with a block satisfies a user-specified condition, execution behavior specific to the satisfaction of that the user-specified condition is performed. For example, when a simulation environment is notified that a power cycle has ended, behavior specific to the termination of a power cycle is performed. The condition may repeatedly transition between true and false within a particular simulation. The performance of a particular execution behavior is triggered by the satisfaction of a user-specified condition involving at least one model variable associated with a block, and not by the beginning or ending of a particular simulation. Thus, in contrast to conventional block diagram environments, the illustrative embodiment of the present invention provides a way to exempt specified blocks from the nominal evaluation of the methods for the block and enable a user to specify when execution behavior should be performed. Furthermore, compile and link stage evaluations may also be performed an arbitrary number of times.

The illustrative embodiment of the present invention provides a graphical programming or modeling environment in which a graphical program or model is simulated/executed or code is generated for the model. In the description of the illustrative embodiment, the simulation of the graphical program/model is also referred to as the execution of the program/model.

The illustrative embodiment will be described below solely for illustrative purposes relative to a time-based block diagram environment. Although the illustrative embodiment will be described relative to the time-based block diagram environment, one of skill in the art will appreciate that the present invention may apply to other graphical programming/modeling environments, including state-based and flow diagram environments, data flow diagram environments and Unified Modeling Language (UML) environments, as long as the graphical model has some notion of semantics that allows it to be transformed into an executable for a computer processor/ microcontroller or directly synthesized in application-specific hardware.

The illustrative embodiment will be described below relative to a Simulink® model, a time-based block diagram found in Simulink® from The MathWorks, Inc. of Natick, Mass. Nevertheless, those of skill in the art will appreciate that the present invention may be practiced relative to models implemented in other graphical modeling environments, including but not limited to LabVIEW from National Instruments Corporation of Austin, Tex., and Rational Rose from IBM of White Plains, N.Y.

In some embodiments, the user-specified conditions model the introduction and removal of power from a block. More generally, the present invention enables state reset and initialization to be part of a hierarchy that is independent of the model decomposition hierarchy but that could be directly related to it.

In some embodiments, a block diagram execution engine contributes to the modeling software task of enabling the computation and tracing of a dynamic system's outputs from its block diagram model. An execution engine carries out the task of compiling and linking the block diagram to produce an "in-memory executable" version of the model that is used for generating code and/or simulating or linearizing a block diagram model. Note that execution of the block-diagram is also referred to as simulation. The compile stage involves checking the integrity and validity of the block interconnections in the block diagram. In this stage, the engine also sorts the blocks in the block diagram into hierarchical lists that are used when creating the block method execution lists. In the link stage, the execution engine uses the result of the compiled stage to allocate memory needed for the execution of the various components of the block diagram. The linking stage also produces block method execution lists, which are used by the simulation or linearization of the block diagram. Included within the link stage is the initialization of the model which consists of evaluating "setup" methods (e.g. block start, initialize, enable, and constant output methods). The block method execution lists are generated because the simulation and/or linearization of a model must execute block methods by type (not by block) when they have a sample hit.

After linking has been performed, the execution engine may generate code. In this stage, the execution engine may choose to translate the block diagram model (or portions of it) into either software modules or hardware descriptions (broadly termed code). If this stage is performed, then the stages that follow use the generated code during the execution of the block diagram. If this stage is skipped completely, then the execution engine uses an interpretive mode of execution for the block diagram. In some cases, the user may not proceed further with the execution of the block diagram because they would like to deploy the code outside the confines of the block diagram software. Upon reaching the simulation stage, the execution engine uses a simulation loop to execute block methods.

For illustrative purposes, we discuss Simulink and Stateflow examples but one skilled in the art will appreciate that the present invention may be used with other graphical modeling, simulation and programming environments. Simulink is one example of an environment that provides users with the ability to model subsystems in a block diagram environment. Two options previously unavailable to users but available in the present invention are the ability to model activity associated with the satisfaction of user selected criteria on model variables. In one embodiment, this provides the ability to model activity associated with simulating an introduction of power and the ability to model activity associated with simulating a removal of power.

The illustrative embodiment of the present invention concerns graphical modeling environments, such as block diagram modeling environments, provided on a computational device. Such block diagrams may be representations of real-world systems that contain nodes (called blocks) interconnected by arcs (called lines). The blocks are functional entities that perform operations. The lines represent data (called signals) being communicated between the various blocks. One of skill in the art will appreciate that the block diagrams are an illustrative graphical modeling environment and the present invention may apply to other types of graphical modeling and programming environments.

FIG. 1A depicts a flow diagram of one embodiment of steps taken in a method for modeling execution behavior of a component in a block diagram. In brief overview, a block is provided (step 120) and a model variable associated with the block is provided (step 122). A user specifies a condition to be satisfied prior to execution behavior of the block being performed (step 124). At least one execution behavior of the block is performed upon satisfaction of the user-specified condition involving at least one model variable associated with the block (step 126).

A block is provided (step 120), the block having at least one execution behavior selected by a user. A model variable is also provided (step 122). In one embodiment, a variable is a Simulink signal. The model variable may be associated with the block.

The block has at least one execution behavior chosen from a plurality of functions related to the block diagram. In some embodiments, a plurality of execution behaviors are chosen by the user. The functions performed by the execution behaviors may be evaluated during execution of the model. In some embodiments, the execution behavior performs evaluation of model characteristics. In other embodiments, the execution behavior performs an evaluation of model functionality. In still other embodiments, the execution behavior performs a function that is conventionally performed prior to the execution phase. In one embodiment, the execution behavior may execute during compilation, which includes, without limitation, sample time propagation, data type propagation, constant propagation, algebraic loop removal, or dead path elimination. In another embodiment, the execution behavior may execute during linking, which includes task list compilation. In still another embodiment, the execution behavior may include methods such as optimization methods, analysis methods, and synthesis methods. In yet another embodiment, the execution behavior may include functions that are associated with block execution such as block output functions, update functions, zero crossing functions, derivative functions, initialization functions, enable functions, termination functions, disable functions, and start functions.

A user specifies a condition to be satisfied prior to execution behavior of the block being performed (step 124). A user may specify a condition when selecting the at least one execution behavior to be performed. In some embodiments, the user specifies a trigger and the execution behavior of the block is performed upon the occurrence of the trigger. In other embodiments, the user specifies a state and the execution behavior of the block is performed when the state is active. In yet other embodiments, the user specifies a state and the execution behavior of the block is performed when the state is inactive. Simulating an introduction of power to a model variable or a removal of power from the model variable are two examples of conditions that a user may specify. The execution behavior of the block is performed when at least one model variable associated with the block satisfies a user-specified condition (step 126).

Figure 1B:
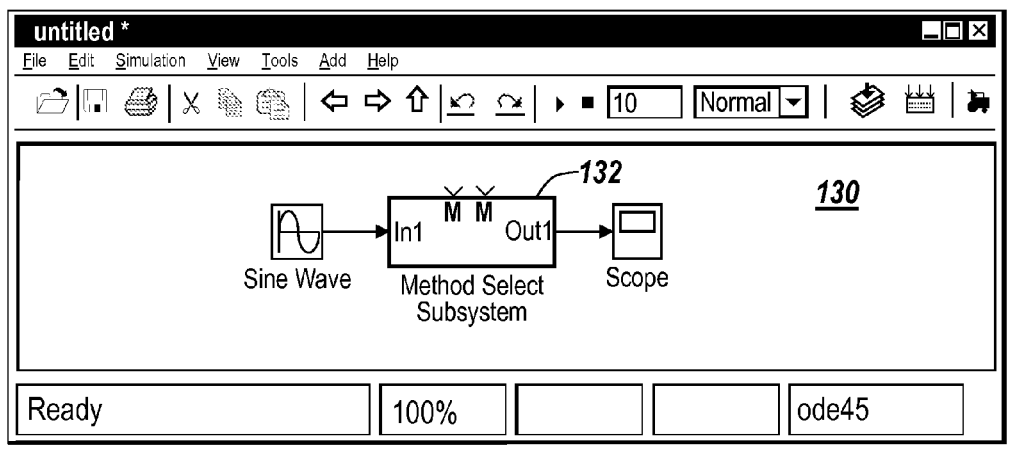
FIG. 1B is a block diagram depicting one embodiment of a block diagram environment including a subsystem.

FIG. 1B shows a block diagram 130 with a subsystem 132, labeled 'Method Select Subsystem' in this embodiment. The subsystem 132 contains two Method Selector input ports marked M that take one or more input signals based on which the user can select methods to be executed.

Figure 1C:
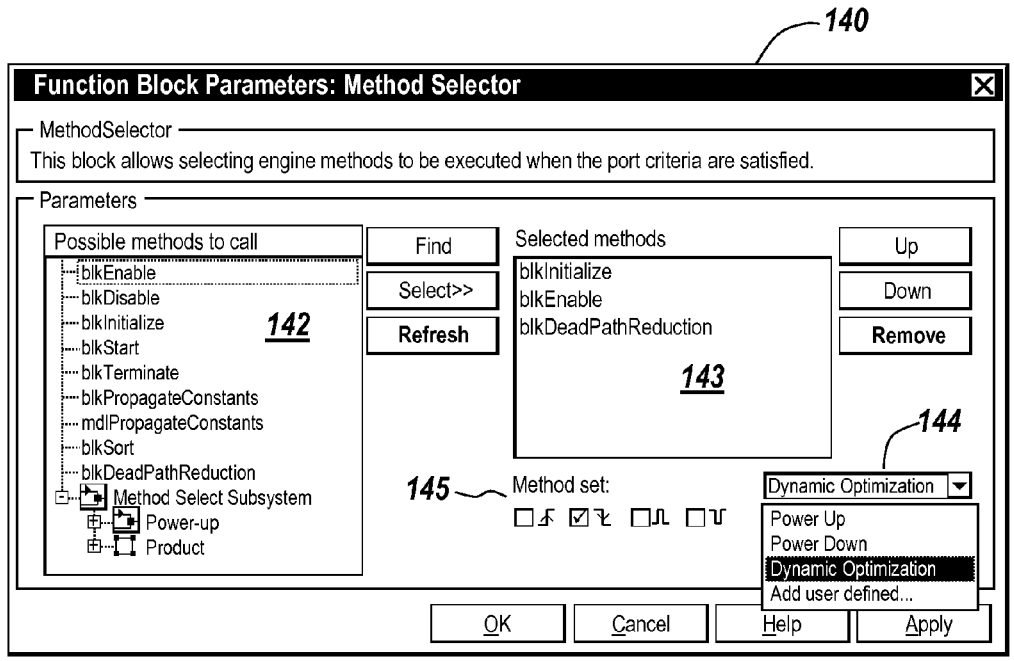
FIG. 1C is a block diagram depicting one embodiment of an apparatus enabling a user to select execution behavior for a block.

FIG. 1C is block diagram depicting one embodiment of an apparatus enabling a user to select execution behavior for a block. FIG. 1C shows a dialog presented to the user. The user may select methods from the list 142 as execution behavior of the block 132. The methods may be executed when the execution behavior of the block is performed. The list 142 may be context dependent. For example, in some embodiments the list 142 may account for the solver type that is used for execution. The list 143 displays to the user the methods that the user has already selected as execution behavior for the block. From the list 142, one or more sets of methods can be composed to form execution behavior of a block. In FIG. 1C, three such sets are present, as illustrated by the list 144. The current three sets are named 'Power Up', 'Power Down', and 'Dynamic Optimization'. Users may add or delete sets from the list 144.

FIG. 1C shows one embodiment where the list 144 includes a presently selected set of methods named 'Dynamic Optimization'. The presently selected set of methods contains the three methods listed in the right-hand list box, 'blkInitialize', 'blkEnable', and 'blkDeadPathReduction'. When an input signal to the corresponding Model Select port satisfies a user-defined criterion, the methods are executed in sequence, starting at the top of the list. In this embodiment, the user criterion can be selected as a combination of a rising-edge trigger, a falling-edge trigger, availability of a value of 1, and the non-availability of a value of 1. These options are shown as a set of checkboxes 145.

The following is an example of designing a power up power down subsystem with the present invention, meant to illustrate and not limit the invention. The user selects a Method Select Subsystem with one Method Selector port. This port then has three method sets associated with it: (1) a method set to be executed when the input signal to the Method Selector port has a rising edge which includes the blkStart, blkInitialize, and blkEnable methods, (2) a method set to be executed when the input signal to the Method Selector port has a falling edge which includes the blkTerminate and blkDisable methods, and (3) a method set to be executed when the input signal to the Model Selector port is 1 (high) which includes the blkOutput method.

The Method Selector allows selection of any method as employed by model processing and execution. This includes model compilation methods such as, for example, mdlPropagateSampleTimes, mdlPropagateConstants, and mdlSort, as well as model linking methods such as mdlInitializeTaskLists and mdlAllocateMemory, but also model execution methods such as mdlJacobian, mdlOutput, mdlZeroCrossings, and mdlUpdate. This furthermore includes block specific methods such as, for example, blkPropagateConstants, blkInitializeTaskLists, blkStart, and blkDerivatives.

Figure 1D:
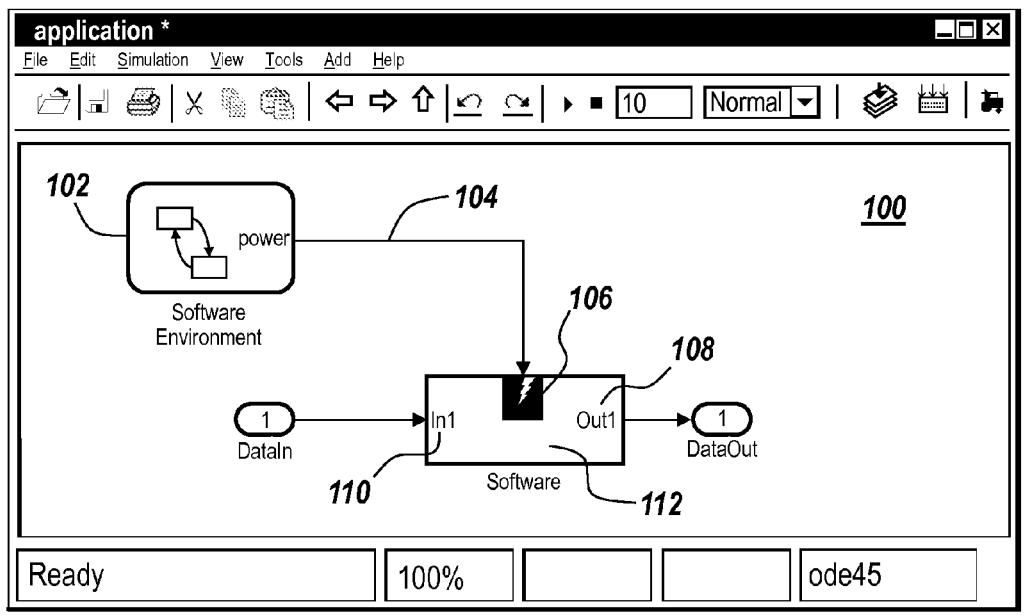
FIG. 1D is a block diagram depicting, in detail, an illustrative example of a block provided in a block diagram environment.

FIG. 1D is a block diagram depicting an illustrative example of how a block diagram provided by the present invention might appear in a block diagram environment 100 where the user-specified condition is satisfied when power is introduced or removed from a component in the block diagram, including a Stateflow block 102 residing in a Simulink diagram and representing a Stateflow diagram, a power state 104, a power up/power down subsystem 112, a power port 106, an out port 108, and in port 110. FIG. 1D is a block diagram model of a dynamic system that may be simulated and from which code may be generated. The power up/power down subsystem 112 is an illustrative example of the block provided by one embodiment of the present invention. In some embodiments, the power up/power down subsystem 112 is a method select subsystem. The power up/power down subsystem 112 is active only when enabled by a control signal, in this case, when enabled by the power in port 110. This example is meant to illustrate and not to limit the invention. In other embodiments, the symbols used vary from those depicted. In still other embodiments, the graphical user interface of the windowing system would differ from the graphical user interface depicted.

The Stateflow diagram 102 includes a power state 104. In one embodiment, the Stateflow diagram 102 is a finite state machine with two states, power up and power down. The power up/power down subsystem 112 includes a power port 106, an out port 108, and an in port 110. When the power state 104 is power up, the Stateflow diagram 102 notifies the power up/power down subsystem 112. In some embodiments, the Stateflow diagram 102 notifies the power up/power down subsystem 112 over the power port 106. When the power port 106 is notified that the power state 104 is power up, in some embodiments, this triggers the performance of power up behavior by the power up/power down subsystem 112. When the power port 106 is notified that the power state 104 is power down, in some embodiments, power up/power down subsystem 112 performs the power down behavior.

Thus, the power state 104 represents state information indicating whether the power is "on" or "off." The state information is communicated to the power up/power down subsystem 112 or another block that is responsive to the state. At state transitions, the power up/power down subsystem 112 or other block performs the appropriate behavior in response to the state transition. For the more general case, a block provides power cycle state information that is received by a block that responds to the state information.

Figure 2:
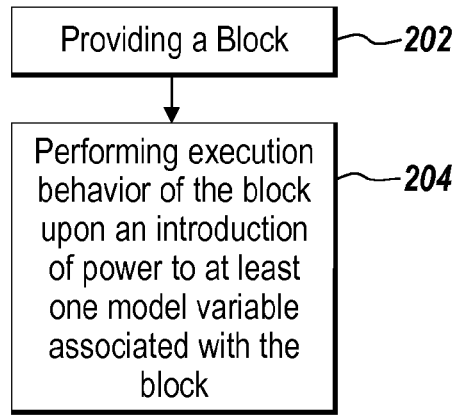
FIG. 2 is a flow diagram depicting one embodiment of the steps taken to model power up behavior of a block in a block diagram environment.

FIG. 2 depicts the steps taken to simulate at least one execution behavior of a block in a block diagram environment in an illustrative embodiment. Initially, a block is provided (step 202). The block may be associated with at least one execution behavior. The at least one execution behavior of the block is performed upon an introduction of power to the block via the at least one model variable associated with the block (step 204).

In some embodiments, the at least one execution behavior comprises initializing an internal state of the block. As noted above, blocks may have state information regarding the current state of the block. It is this state information that may be initialized for the block to begin to perform its designated role in a model. The at least one execution behavior may also include initiating execution upon each simulated introduction of power to the block. In some embodiments, the at least one execution behavior comprises initializing one or more hardware components associated with the block. For embodiments where the at least one execution behavior is required to be performed not at the beginning of simulation (as in conventional systems) but rather during the simulation, at the simulated introduction of power to the at least one model variable associated with the block, the block may be configured to enable the at least one execution behavior to be performed at a time other than the initialization of the simulation. In some cases, the at least one execution behavior of the block is performed for more than one simulated introduction of power to the block via at least one model variable associated with the block. Over the course of a single simulation, there may be more than one simulated introduction of power to the block via at least one model variable associated with the block.

Figure 3:
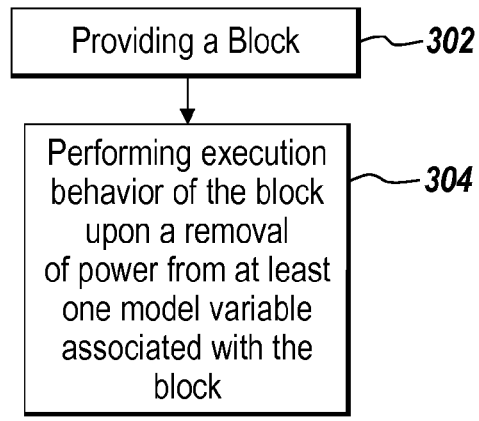
FIG. 3 is a flow diagram depicting one embodiment of the steps taken to model power down behavior of a block in a block diagram environment.

FIG. 3 depicts steps taken to model execution behavior of a block in a block diagram in an embodiment of the present invention. A block is provided that is associated with at least one model variable and that is responsive to the simulated removal of power (step 302). The execution behavior of the block is performed upon a simulated removal of power from the block via at least one model variable associated with the block (step 304). In some instances, the execution behavior of the block is performed for more than one simulated removal of power from the block via at least one model variable associated with the block. In some embodiments, the at least one execution behavior may include resetting an internal state of the block to and/or terminating simulation upon each simulated removal of power from the at least one model variable associated with the block. In some embodiments, the at least one execution behavior also includes initializing one or more hardware components associated with the block.

Figure 4:
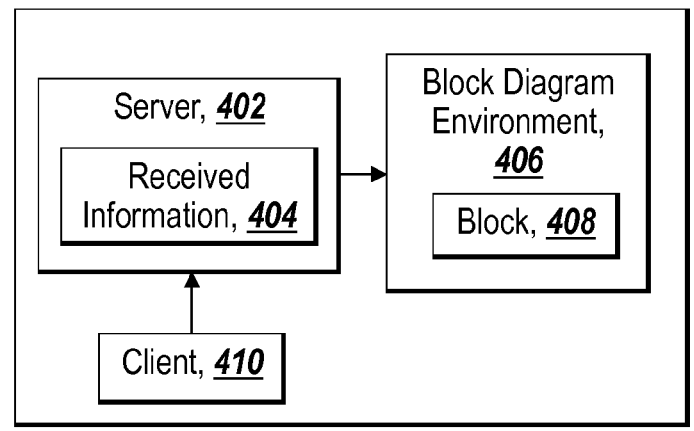
FIG. 4 is a block diagram depicting one embodiment of a system generating a block diagram and simulating power up behavior of a block in the block diagram.

Referring now to FIG. 4, a block diagram depicts one embodiment of a system for generating a block diagram and modeling at least one execution behavior of a block in the block diagram. The system includes a server 402, received information 404, a block diagram environment 406, a block 408, and a client 410. In brief overview, the server 402, receiving information 404 from client 410 about the block 408, generates a block diagram in a block diagram environment 406, responsive to the received information 404.

In some embodiments, the server 402 generates the block diagram 406 with block 408 responsive to the information 404. In some of these embodiments, the received information 404 comprises a client 410 request for the server 402 to generate a block 408 capable of simulating power up behavior or power down behavior. In others of these embodiments, the received information 404 comprises a client request that the block 408 be capable of simulating both power up and power down behavior.

In some embodiments, the server 402 resides on a network in a client-server system. In some of these embodiments, the server receives information 404 over the network. In some embodiments, the server receives information 404 from the client 410 on the client-server system.

Figure 5:
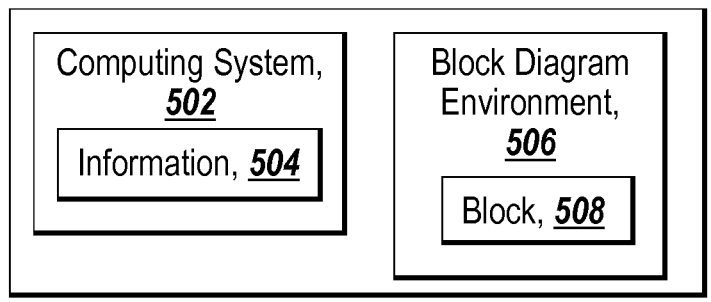
FIG. 5 is a block diagram of an embodiment of a system generating a block diagram and simulating power down behavior of a block in the block diagram.

In FIG. 5, a block diagram depicts one embodiment of a system generating a block diagram and modeling execution behavior of a block in the block diagram. The system includes a computing system 502, information 504, a block diagram environment 506, and a block 508. In brief overview, the computing system 502, containing information 504 about the block 508, generates a block diagram in a block diagram environment 506, responsive to the information 504. In the embodiment depicted in FIG. 5, there is only a single computing system and not a client-server networked system.

In some embodiments, the computing system 502 generates the block diagram 506 with block 508 responsive to the information 504. The received information 504 may be a user request for the computing system 502 to generate a block 508 capable of simulating power up behavior or power down behavior. In others of these embodiments, the user requests that the block 508 be capable of simulating both power up and power down behavior.

Although only one computing system 502, server 402, block 408, and block 508 are depicted in the embodiment shown in FIG. 4 and FIG. 5, it should be understood that the system might provide multiple ones of any or each of those components. Additionally, a block 508 or block 408 might have, in some embodiments, both power up and power down behavior within a single block.

Figure 6:
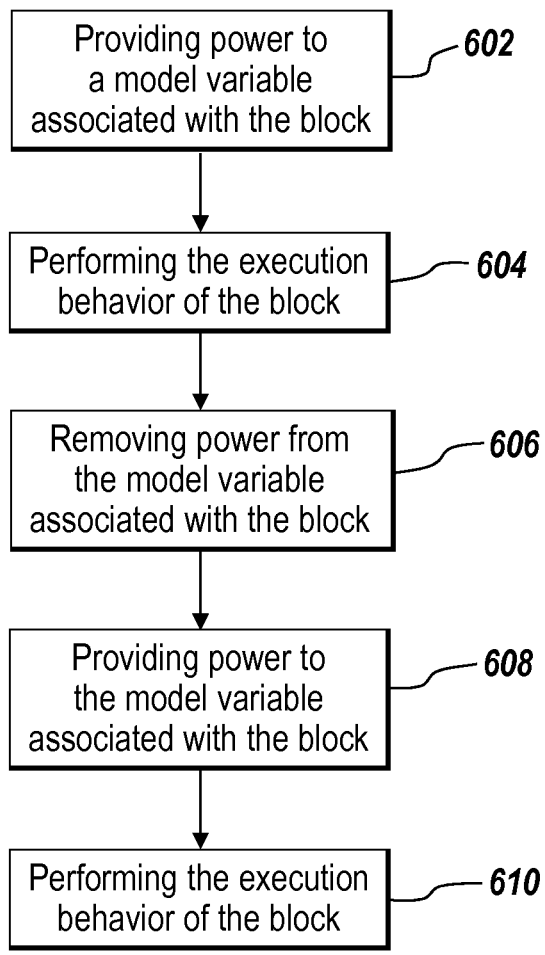
FIG. 6 is a flow diagram depicting one embodiment of the steps taken to perform power up behavior of a block more than one time in a simulation.

Referring now to FIG. 6, a flow diagram depicts the steps taken to perform at least one execution behavior of a block more than one time in a simulation. Power may be provided to and removed from a block via at least one model variable associated with the block more than one time, in some embodiments. The block has at least one execution behavior, which is performed at each simulated introduction of power to the block via at least one model variable associated with the block. In some embodiments, power is provided to the block via at least one model variable associated with a block a first time (step 602). The at least one execution behavior of the block is then performed (step 604). A removal of power from the block via at least one model variable associated with the block occurs (step 606), followed at a later point in time by a second provision of power to the block via at least one model variable associated with the block (step 608). At the second provision of power to the block via at least one model variable associated with the block, the at least one execution behavior of the block is performed a second time (step 610). In these embodiments, the at least one execution behavior would be performed each time that power is provided to the block via at least one model variable associated with the block.

Figure 7:
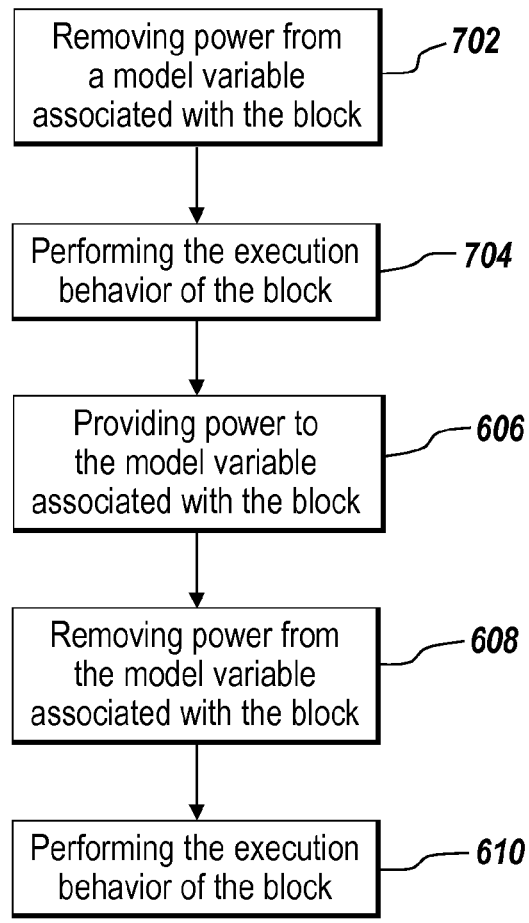
FIG. 7 is a flow diagram depicting one embodiment of the steps taken to perform power down behavior of a block more than one time in a simulation.

In FIG. 7, a flow diagram depicts the steps taken to perform power up and power down behavior of a block more than one time in a simulation. Power may be provided to and removed from the block via at least one model variable associated with the block more than one time, in some embodiments. The block has power down behavior, which is performed at each removal of power from the block via at least one model variable associated with the block. In some embodiments, power is removed from the block via at least one model variable associated with the block a first time (step 702). The power down behavior of the block is then performed (step 704). An introduction of power to the block via at least one model variable associated with the block occurs (step 706), followed at a later point in time by a second removal of power from the block via at least one model variable associated with the block (step 708). At the second removal of power from the block via at least one model variable associated with the block, the power down behavior of the block is performed a second time (step 710). In these embodiments, the power down behavior would be performed each time that power is provided to the block via at least one model variable associated with the block.

Figure 8:
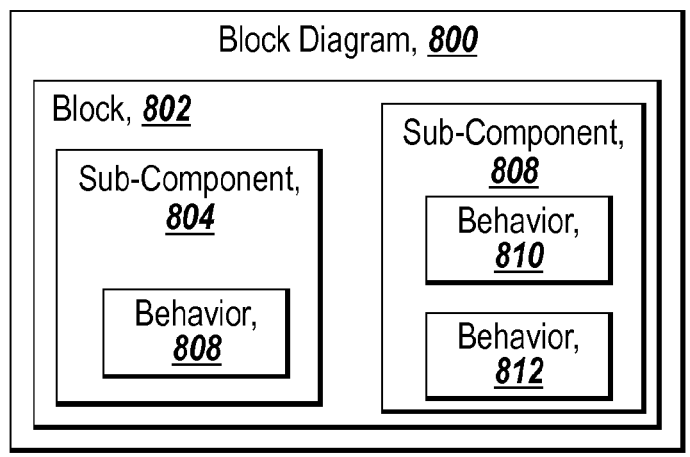
FIG. 8 is a block diagram depicting, in detail, one embodiment of a block provided by the present invention in a block diagram.

In FIG. 8, a block diagram depicts, in detail, one embodiment of a block 802 in a block diagram 800. In some embodiments, the block 802 comprises one or more sub-components 804 and 808. In some embodiments, a sub-component 804 or 808 may have more than one behavior. For example, sub-component 808 could, in some embodiments, have behavior 810 and behavior 812, and each behavior could be different. Behavior 810 could be power up behavior and behavior 812 could be power down behavior.

For each block 802 in a block diagram 800, and for each sub-component 804 or 808, state control is intrinsic and independent. That is, each sub-component 804 or 808 within a block 802 and each block 802 within a block diagram 800 retains control over its own behavior. State reset and initialization for each block 802, and for each sub-component 804 within the block 802, may be part of an initialization hierarchy that is independent of the model decomposition hierarchy but that could be directly related to it.

The power behavior of each sub-component is performed when the power is provided to or removed from the sub-component. The power behavior of each sub-component in these embodiments may be different from the power behavior of other sub-components within the same block 802, and from the power up behavior of the block 802. Additionally, in some of these embodiments, power may be supplied to or removed from each sub-component at a different time from when power is provided to or removed from other sub-components within the same block 802, and from when power is provided to or removed from the block 802.

In some embodiments, a block 802 may contain one or more sub-components with nonvolatile states. For example, within block 802, a particular sub-component 804 may have behavior 808 designating an internal state to be non-volatile.

FIG. 9 shows a block diagram for an embodiment of a system containing a power up and power down subsystem. As discussed above with regards to FIG. 8, a block diagram environment may comprise blocks 802 having state control intrinsic to the block 802 and independent from any other block. Similarly, in some embodiments, a system within a block diagram 900 may have multiple subsystems 902 and 904, each of which have independent execution behavior.

Referring now to FIG. 9 and in greater detail, a subsystem 902 may reside within a block diagram 900 and may model one or more blocks 802. The present invention provides a new functionality to previously existing subsystems in that the present invention enables a subsystem to be a power up subsystem or a power down subsystem. The subsystem 902, in one embodiment, is a power up system. In this embodiment, subsystem 902 executes power up behavior on the first time-step after the block diagram 900 powers up. The subsystem 904 is a power down system executing power down behavior as the block diagram 900 powers down. In environments using Simulink, a "Ports and Subsystems" library of subsystems may be modified to include new blocks supporting this functionality. These modified blocks may include a power up/power down port block and a power up/power down subsystem, comprising a power up/power down port block and an in-port connected to an out-port.

The parent block diagram 900 depicted in FIG. 9 includes a power up subsystem 902 and a power down subsystem 904. Both power up subsystem 902 and power down subsystem 904 accept inputs, and power up subsystem 902 generates output, which is sent via the product element 906, to the power down subsystem 904. As depicted in FIG. 9, the power up subsystem 902 comprises a data store read element 908, a product element 906, and a lookup table 912. These elements interact with input to generate an output which the power up subsystem sends to other elements and subsystems in the parent block diagram 900. Similarly, as depicted in FIG. 9, the power down subsystem 904 comprises a lookup table 914 and a data store write element 916 each interact with each other and with an input to the power down subsystem 904. One skilled in the art will appreciate the elements within each subsystem may vary from those depicted in FIG. 9.

Using a subsystem 902 or subsystem 904 improves code efficiency by providing a mechanism for executing blocks at a restricted set of times—the times when the parent block diagram 900 is powered up or powered down. Using the subsystem provides a mechanism for specifying blocks that execute at power up or at power down only. Additionally, using a subsystem 902 or subsystem 904 provides a new semantic whereby blocks can be executed during simulated system shutdown.

A sub-system in the block diagram 900 may have a property enabling persistence of values contained in the sub-system to persist throughout a simulated non-operational cycle. Thus, the present invention enables prevention of loss of a value at power down or power up of the sub-system 902 or 904 and at power down or power up of the parent block diagram 900. The power up subsystem 902 may be persistent to allow retainment of values contained within the power up subsystem 902 throughout a non-operational cycle. The power down subsystem 904 may also be persistent to enable retainment of values contained within the power down subsystem 904 throughout the non-operational cycle.

Referring now to FIG. 10, a code fragment depicts one embodiment of code generated for a block diagram 900 containing a power up subsystem 902 and a power down subsystem 904. Line 5 depicts one embodiment in which the execution of the code for the power up subsystem 902 occurs when the block diagram 900 is powering up. Line 16 depicts another embodiment in which the execution of the code for the power down subsystem occurs when block diagram 900 is powering down.

Figure 11:
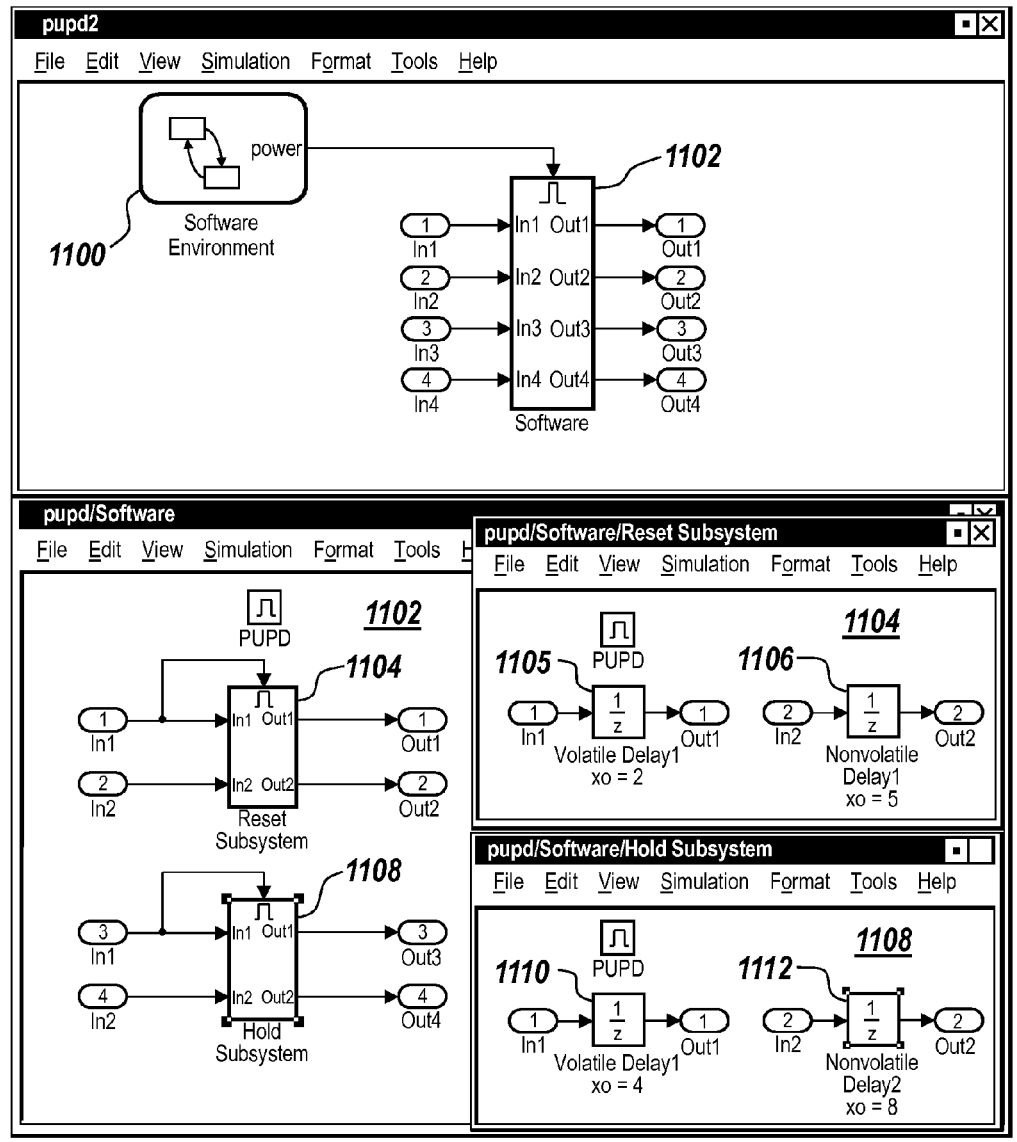
FIG. 11 is a block diagram depicting in greater detail one embodiment of a system with two subsystems.

Referring now to FIG. 11, a block diagram depicts in greater detail one embodiment of a system with two subsystems. In one embodiment, the software environment 1100, includes software 102. Software 1102 includes a reset subsystem 1104, and a hold subsystem 1108. In one embodiment, state reset and initialization are part of a hierarchy that is independent of the model decomposition hierarchy but that could be directly related to it.

In one embodiment, the reset subsystem 1104 is configured to reset the values of its states when transitioning from disabled to enabled (such as when the signal entering its control port on the top of the block becomes positive). In another embodiment, the hold subsystem 1108 is configured to hold the values of its states when transitioning from disabled to enabled (when the signal entering its control port on the top of the block becomes positive).

As depicted in FIG. 11, the reset subsystem 1104 comprises a volatile delay element 1105 and a nonvolatile delay element 1106. These elements interact with input to generate an output, which the reset subsystem 1104 sends to other elements and the hold subsystem 1108 in the software 1102. Similarly, as depicted in FIG. 11, the hold subsystem 1108 comprises a volatile delay element 110 and a nonvolatile delay element 112 and each of these elements interact with input to the hold subsystem 1108 and generate output. One skilled in the art will appreciate the elements within each subsystem may vary from those depicted in FIG. 11.

One embodiment of code for an accelerated simulation of the software 1102 is shown in FIG. 12. In this embodiment, at Time 0 nonvolatile states have their values initialized (lines 2-4), independent of where they are used in the hierarchy. When the software 1102 transitions from powered down to powered up, the volatile states of the system are initialized (lines 13-14), regardless of where they are used in the hierarchy. In contrast, when the hold subsystem 1108 transitions from disabled to enabled, only the volatile state of "Volatile Delay 1" initializes (line 23) because it resides within that portion of the model hierarchy. Finally, when the software 1102 powers down, the volatile states are reset (lines 54-55), once more regardless of where they reside in the hierarchy.

Figure 13:
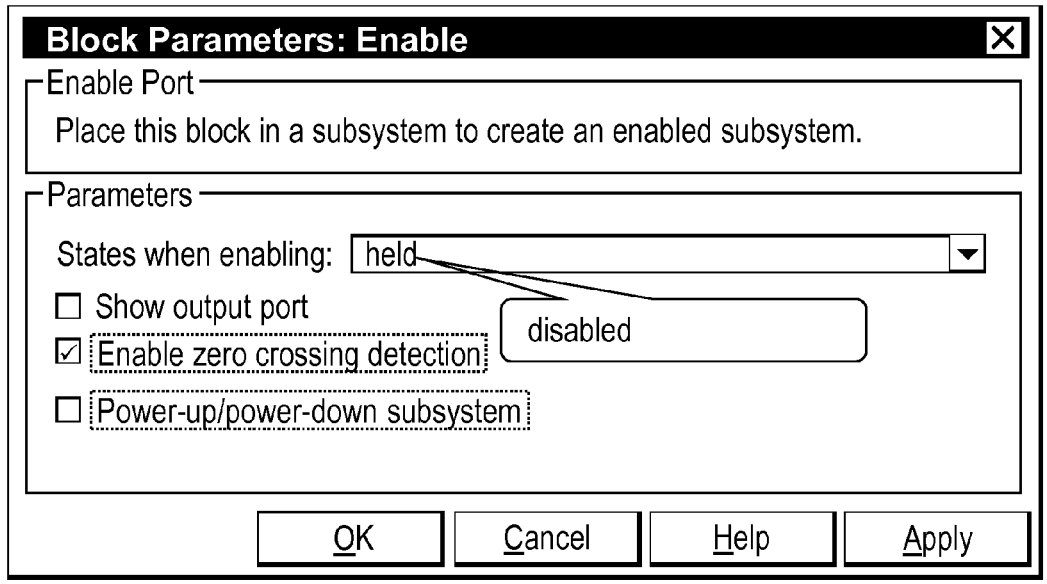
FIG. 13 is a block diagram is an illustrative enable port dialog.

FIG. 13 shows an example of a dialog for the enable port of a power up/power down subsystem block in an illustrative embodiment of the present invention. The parameters portion of the dialog includes a check box to designate whether the subsystem will be a power up/power down subsystem. Power up/power down subsystems are an illustrative case of a system block or subsystem that incorporates the principles of the present invention. The present invention is not limited to the power up/power down subsystem case.

In some embodiments, prior to providing the block, user input is received about the block. In some of these embodiments, the user input may comprise a request to model the power up behavior of the block. In others of these embodiments, the determination to model the block is based upon evaluating the received user input. In other embodiments, the user input may comprise a request to simulate the power up behavior of the block. In some of these embodiments, the determination to simulate the block is based upon evaluating the received user input.

In some embodiments, the graphical user interface collects information using checkmark boxes. In other embodiments, the graphical user interface collects information using objects other than checkmark boxes. This example is meant to illustrate and not to limit the invention.

The illustrative embodiment of the present invention enables the use of a "non-volatile" property with a powered subsystem block. The property allows an instance of data to be specified as non-volatile. The designation of the instance of data as "non-volatile" results in the value of the instance of data being retained by the powered subsystem when the powered subsystem is disabled or re-enabled. The initial condition of the instance of data is applied only a single time, such as when the powered subsystem first enables.

Figure 14:
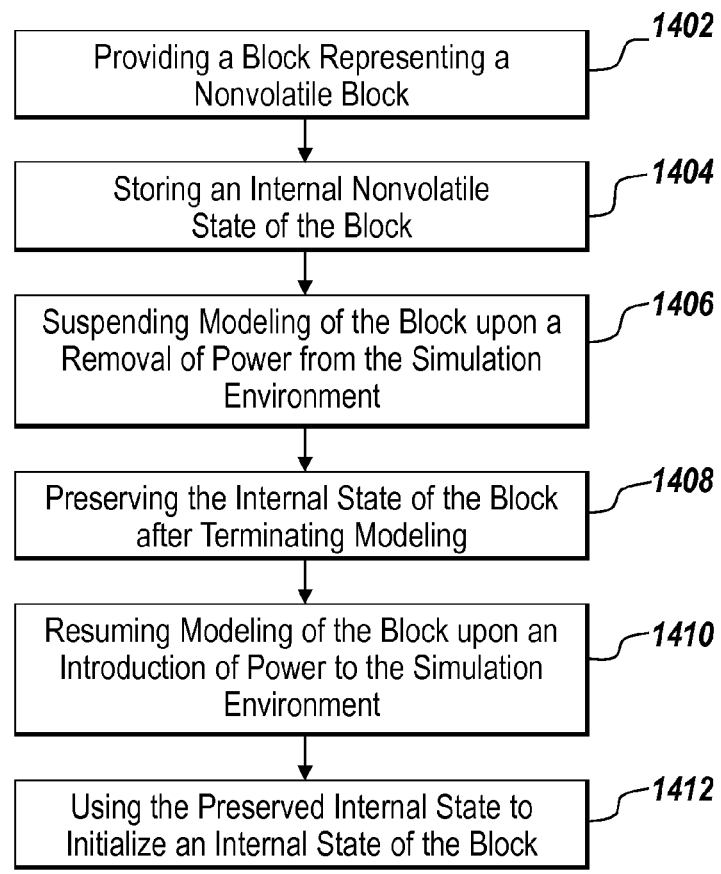
FIG. 14 is a flow diagram depicting one embodiment of the steps taken to model a nonvolatile block in a block diagram environment.

Referring now to FIG. 14, a flow diagram depicts one embodiment of the steps taken to model a block with a non-volatile state in a block diagram environment. In brief overview, a block representing a block with a nonvolatile state is provided (step 1402). An internal nonvolatile state of the block is stored (step 1404). Modeling of the block is suspended upon a removal of power from the simulation environment (step 1406). The internal nonvolatile state of the block is preserved upon suspension of the modeling (step 1408). Modeling of the block is resumed upon an introduction of power to the simulation environment (step 1410). The preserved internal nonvolatile state of the block is used to initialize an internal state of the block upon initiation of modeling of the block (step 1412).

Referring to FIG. 14, and in more detail, in one embodiment a determination is made to model a block with a nonvolatile state in a block diagram environment for more than one cycle of introducing and removing power from the block. In some embodiments, information about the block with a nonvolatile state is received. In some of these embodiments, the determination to model a block with a nonvolatile state is made responsive to the received information.

An internal nonvolatile state of the block is stored (step 1404). In some embodiments, more than one internal nonvolatile state of the block may be stored. In other embodiments, there are volatile and nonvolatile states within the same block. In still other embodiments, the received information identifies the internal nonvolatile state or states to be stored.

In one embodiment, modeling of the block is suspended upon a removal of power from the simulation environment (step 1406) and the internal nonvolatile state of the block is preserved upon suspension of the modeling (step 1408). In this embodiment, the preservation of an internal nonvolatile state or states of the block after suspension of the modeling and usability of the preserved internal nonvolatile state or states are the characteristics of the state or states that make it nonvolatile. The internal nonvolatile state may be stored on a server, in some embodiments. In other embodiments, the internal nonvolatile state may be stored on a data store.

Modeling of the block is resumed upon an introduction of power to the simulation environment (step 1410). In some embodiments, modeling of the block includes performing power up behavior of the block. The power up behavior of the block may include initializing internal states of the block. In one embodiment, the preserved internal nonvolatile state of the block is used to initialize the same internal nonvolatile state of the block upon initiation of modeling of the block (step 1412). In this embodiment, the internal state of the block is the same before termination of the modeling and after initialization of modeling of the block.

Figure 15:
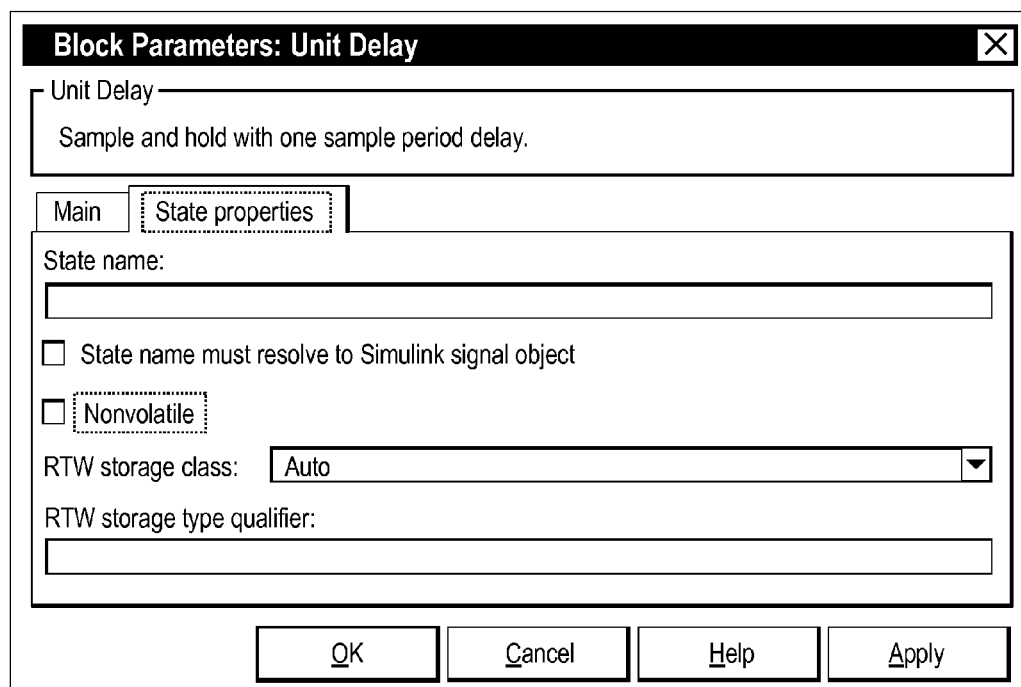
FIG. 15 is a block diagram depicting an illustrative example of a graphical user interface on a server collecting information.

FIG. 15 is a block diagram depicting an illustrative example of a graphical user interface on server 402 collecting information 404. In one embodiment of the server 402, a graphical user interface collects information 404. In some embodiments, the graphical user interface collects information 404 using checkmark boxes. In other embodiments, the graphical user interface collects information 404 using objects other than checkmark boxes. This example is meant to illustrate and not to limit the invention.

Figure 16:
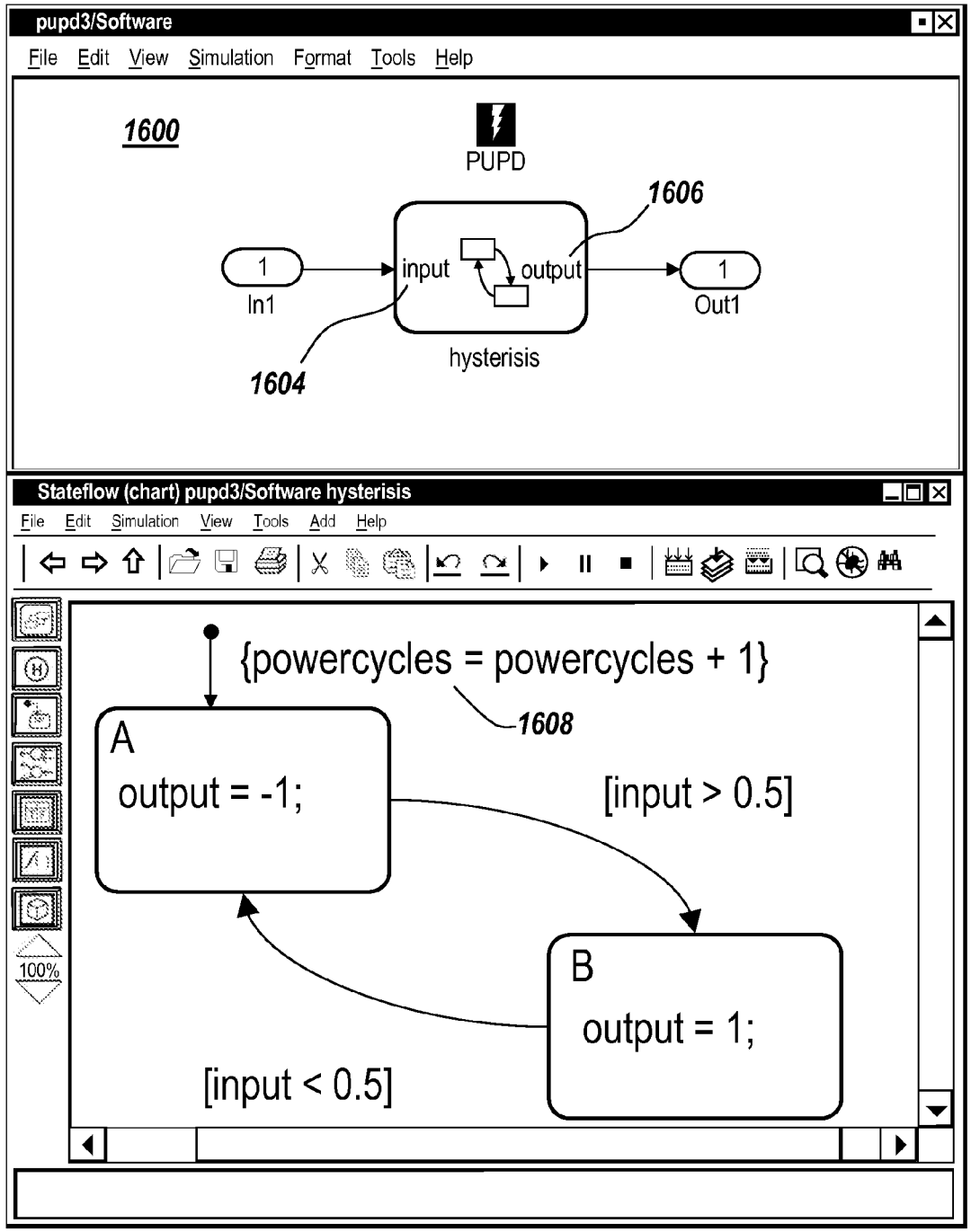
FIG. 16 is a block diagram depicting, in greater detail, one embodiment of the steps taken to model a nonvolatile variable in a block diagram environment such as a Stateflow chart.

Referring now to FIG. 16; a block diagram depicts, in greater detail, one embodiment of the steps taken to model a nonvolatile variable in a block diagram environment such as a Stateflow chart. In brief overview, a block diagram environment 1600 includes a chart 1602, data input 1604, data output 1606, and variable 1608. In some embodiments, Stateflow charts enable the graphical representation of hierarchical and parallel states and the event-driven transitions between them.

Referring to FIG. 16, and in more detail, in one embodiment a determination is made to model a variable with a nonvolatile state in a block diagram environment for more than one cycle of introducing and removing power from the environment. In some embodiments, variable 1608 inherits a value from a parent variable when the parent variable is powered up. In these embodiments, the value of the variable 1608 persists from one invocation of the chart 1602 to the next. In one embodiment, rather than resetting the value of the variable 1608, a property of the variable 1608 in chart 1602 enables a user to specify that the value of the local variable 1608 is not reset when the parent of the chart cycles its power. In this embodiment, the user defines for local data when the value of a variable 1608 persists in spite of the removal of power or the introduction of power.

Figure 17:
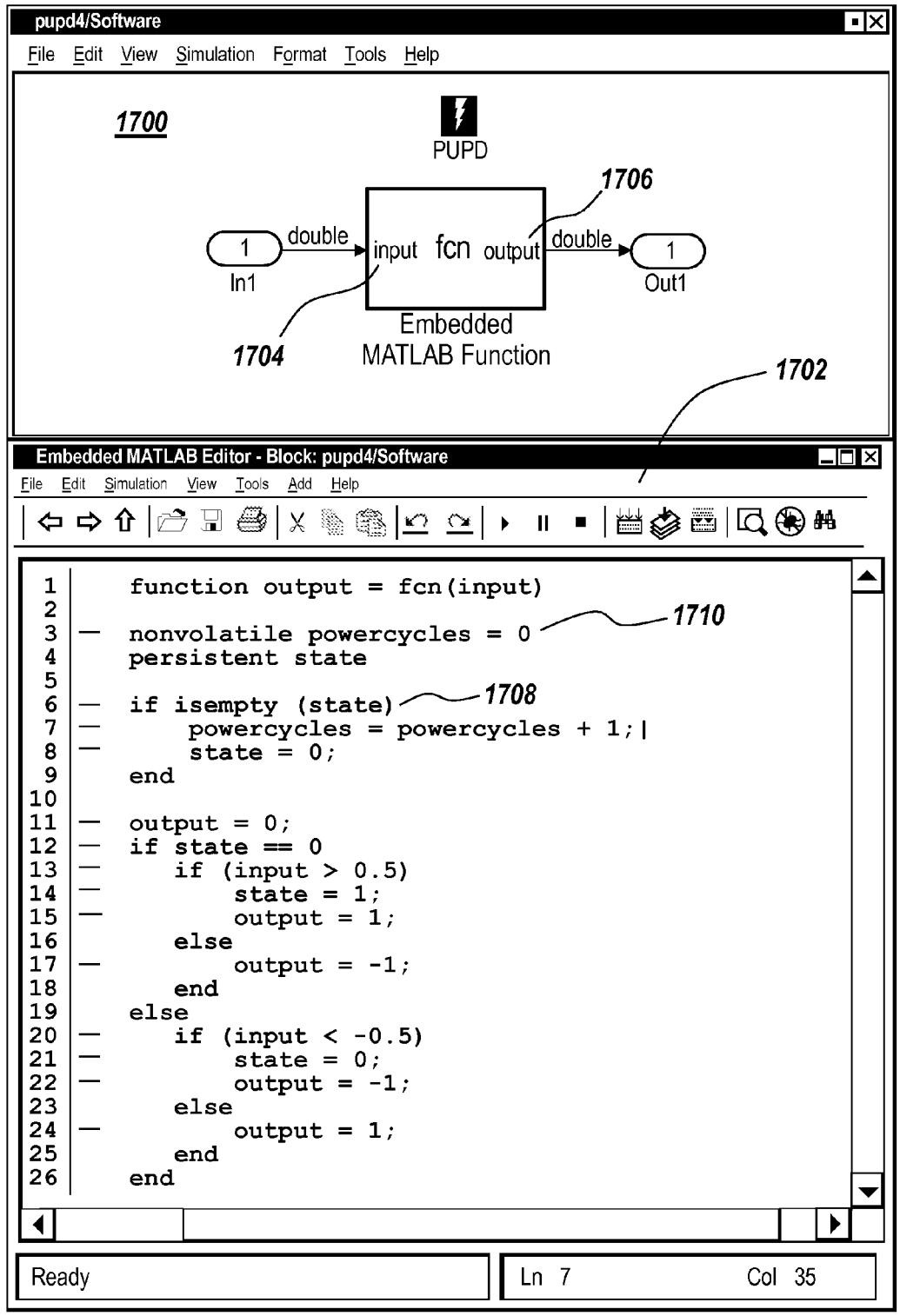
FIG. 17 is a block diagram depicting one embodiment of a variable with a nonvolatile state in an embedded MATLAB block diagram environment.

Referring now to FIG. 17, a block diagram depicts one embodiment of a variable with a nonvolatile state in an embedded MATLAB block diagram environment. In this embodiment, the block diagram environment 1700 includes an editor 1702, data input 1704, data output 1706, variable 1708, and variable 1710.

In one embodiment, the variable 1708, labeled "state," is defined to be "persistent." In this embodiment, its value is reset only when the parent system powers up. In one embodiment, the variable 1710, labeled "power cycles," is declared to be nonvolatile.

FIG. 18 depicts one embodiment of code generated for an embedded MATLAB environment in which a variable has a nonvolatile value. In this embodiment, during a simulation, variable 1810 is initialized once at time 0. In one embodiment, when code is generated for an embedded application, variable 1810 is not initialized. In this embodiment, the environment is responsible for any initialization of nonvolatile memory that occurs.

Figure 19:
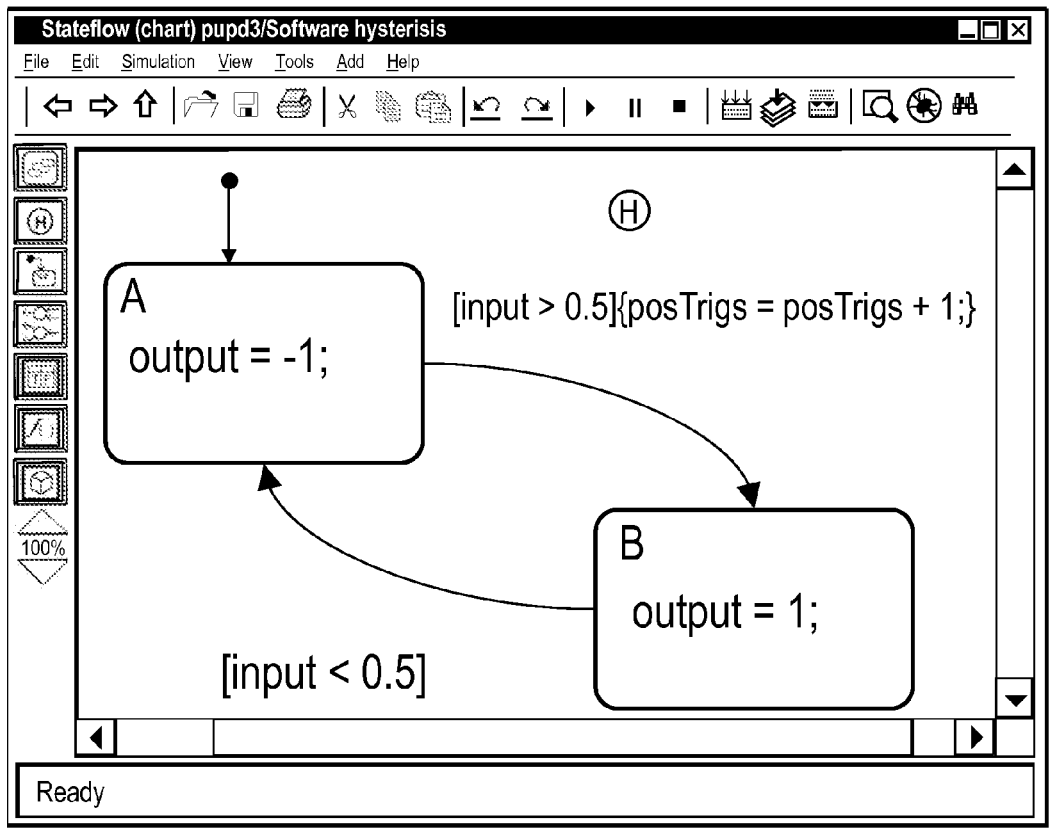
FIG. 19 is a block diagram depicting, in greater detail, one embodiment of the steps taken to model a nonvolatile variable in a block diagram environment such as a Stateflow chart with a history junction.

Referring now to FIG. 19, a block diagram depicts, in greater detail, one embodiment of the steps taken to model a nonvolatile variable in a block diagram environment such as a Stateflow chart with a history junction. In brief overview, FIG. 19 shows a Stateflow chart with a History Junction at its top level. A history junction is used to represent historical decision points in the Stateflow diagram. The decision points are based on historical data relative to state activity. Placing a history junction in a superstate indicates that historical state activity information is used to determine the next state to become active.

Referring now to FIG. 19, and in greater detail, in one embodiment, a decision is made to model a nonvolatile history junction. In this embodiment, because of the nonvolatile history junction, when the parent of the chart is powered down and then powered up again, the chart does not reinitialize. The state that was active when the parent of the chart powered down continues to be the active state when that parent is powered up again. Furthermore, all local variables in the chart are nonvolatile so that their values are not reset due to the parent of the chart being powered down.

As described in FIG. 8 above, each block 802 in a block diagram 800, and for each sub-component 804 or 808 in a block 802, state control is intrinsic and independent. That is, each sub-component 804 or 808 within a block 802 and each block 802 within a block diagram 800 retains control over its own behavior. State reset and initialization for each block 802, and for each sub-component 804 within the block 802, transcends any hierarchical state behavior or properties.

Figure 20:
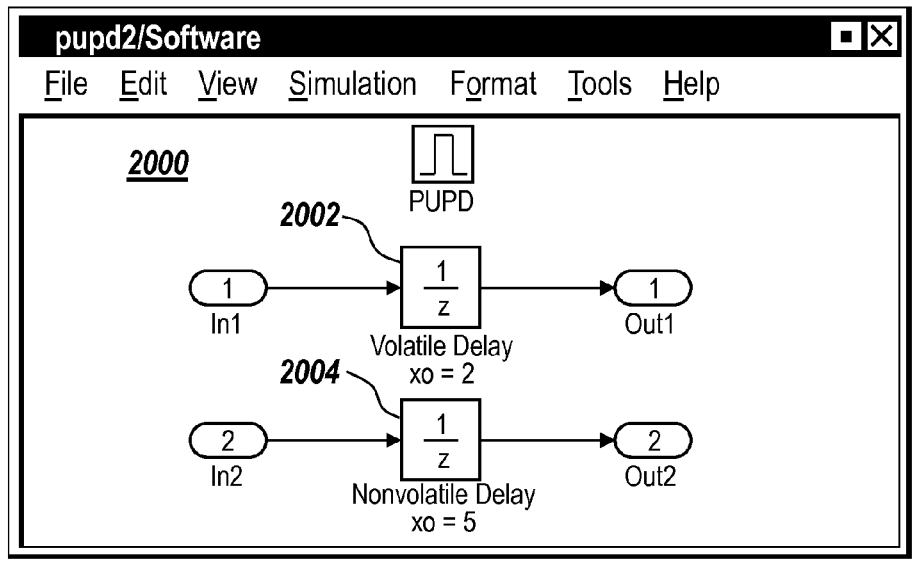
FIG. 20 is a block diagram depicting one embodiment of a system containing blocks in a block diagram environment referencing both volatile and nonvolatile memory.

Referring now to FIG. 20, a block diagram depicts one embodiment of a system 2000 containing blocks that reference both volatile and nonvolatile memory, including a volatile delay block 2002 and nonvolatile delay block 2004. In one embodiment, the top delay block in FIG. 20, volatile delay block 2002, specifies that its memory is volatile. In another embodiment, the bottom delay block, nonvolatile delay block 2004 specifies that its memory is nonvolatile. In these embodiments, FIG. 20 depicts the initial conditions of the memory of the two blocks 2002 and 2004 as having the values 2 and 5.

Referring to FIG. 20 in greater detail, in one embodiment, a nonvolatile memory stores a value even when the software with which it is used in conjunction is not powered up. Accordingly, in some embodiments, the memory of nonvolatile delay block 2004 will be initialized to 5 at the start of simulation, independent of when or even if the system is initially powered up. In one embodiment, the memory of volatile delay block 2002 is not active when the software is not executing, and therefore its initialization to 2 is deferred until the system powers up. Furthermore, the initialization for volatile delay block 2002 is repeated each time the system powers up. In these embodiments, each time the system is powered down, the memory for volatile delay block 2002 is reset by default to 0, while the memory for nonvolatile delay block 2004 remains set at its current value.

Referring now to FIG. 21, one embodiment is depicted of generated code for simulation of a system in the present invention. In one embodiment, code is generated for an accelerated simulation of the system as well as its parent context. In this embodiment, the code uses a software mode to keep track of the state of the power signal, to enable simulation of the system being powered up and powered down by the software environment. In one embodiment, the software mode comprises powering up the system from an unpowered state. In another embodiment, the software mode comprises the system already being powered up. In still another embodiment, the software mode comprises powering down the system from a powered state. In yet another embodiment, the software mode comprises the system already being powered down.

Referring now to FIG. 21, and in greater detail, lines 2 through 4 of the code initialize nonvolatile memory at time 0, to simulate that this memory's value persists in the software environment, independent of power being applied to the software of the system. Line 10 initializes the volatile memory of the system each time it transitions from powered down to powered up. Lines 25-28 reset the values of the volatile memory and the system outputs to 0 by default when the software is powered down; if the data is of a fixed-point type, it will be reset to integer 0 by default.

In one embodiment, depicted in FIG. 22, code is used to detect transitions from a powered down state to a powered up state. In this embodiment, the code would be used in conjunction with the detectPowerState( ) code, depicted in FIG. 21. In another embodiment, where standalone code is being generated for usage of the system as a software component in a real-world software environment, then there is no need to simulate the power down action, and the system merely needs to keep track of time in order to initialize its data at time 0. FIG. 23 depicts one embodiment of code generated independent of any software environment. In this embodiment, the code may be used to initialize data at time 0 but no software is generated to initialize the nonvolatile memory.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method comprising:
   interacting with a block of a model,
      the interacting being performed by a computing device;
   storing information regarding a state of the block,
      the storing being performed by the computing device;
   removing first power to the block,
      the first power being applied to the block at a first time, and
      the removing being performed by the computing device;
   suspending, based on removing the first power to the block, simulation of a behavior of the block,
      the suspending being performed by the computing device;
   preserving, based on the suspending the simulation of the behavior of the block, the state of the block,
      the preserving being performed by the computing device;
   applying second power to the block,
      the second power being applied to the block at a second time,
      the second time occurring after the first time, and
      the applying being performed by the computing device;
   resuming, based on applying the second power, the simulation of the behavior of the block,
      the resuming being performed by the computing device; and
   performing, based on resuming the simulation of the behavior of the block, an operation associated with the block,
      the performing the operation being performed by the computing device.

2. The method of claim 1, further comprising:
   receiving first information from a user,
      the first information including:
         second information associated with a condition to be satisfied before simulating the behavior of the block;
   determining that the condition is satisfied; and
   simulating, based on determining that the condition is satisfied, the behavior of the block.

3. The method of claim 1, where, when preserving the state of the block, the method includes:
   preserving a plurality of states of the block.

4. The method of claim 3, where the plurality of states include at least one volatile state and at least one nonvolatile state.

5. The method of claim 1, where, when resuming the simulation of the behavior of the block, the method includes:
   initializing one or more internal states of the block.

6. The method of claim 1, further comprising:
   simulating, based on applying the first power, the behavior of the block.

7. The method of claim 1, further comprising:
   generating code for the block.

8. A non-transitory computer-readable medium storing instructions, the instructions comprising:
   one or more instructions which, when executed by a processor, cause the processor to:
      interact with a block of a model;
      store information regarding a state of the block;
      remove first power to the block,
         the first power being applied to the block at a first time;
      suspend, based on removing the first power to the block, simulation of a behavior of the block;
      preserve, based on the suspending the simulation of the behavior of the block, the state of the block;
      apply second power to the block,
         the second power being applied to the block at a second time, and
         the second time occurring after the first time;
      resume, based on applying the second power, the simulation of the behavior of the block; and
      perform, based on resuming the simulation of the behavior of the block, an operation associated with the block.

9. The medium of claim 8, where the instructions further include:
   one or more instructions to receive first information from a user,
      the first information including:
         second information associated with a condition to be satisfied before simulating the behavior of the block;
   one or more instructions to determine that the condition is satisfied; and
   one or more instructions to simulate, based on determining that the condition is satisfied, the behavior of the block.

10. The medium of claim 8, where the one or more instructions to preserve the state of the block include:
    one or more instructions to preserve a plurality of states of the block.

11. The medium of claim 10, where the plurality of states include at least one volatile state and at least one nonvolatile state.

12. The medium of claim 8, where the one or more instructions to resume the simulation of the behavior of the block include:
    one or more instructions to initialize one or more internal states of the block.

13. The medium of claim 8, where the instructions further include:
    one or more instructions to simulate, based on applying the first power, the behavior of the block.

14. The medium of claim 8, where the instructions further include:
    one or more instructions to generate code for the block.

15. A non-transitory computer-readable medium storing instructions, the instructions comprising:
    one or more instructions which, when executed by a processor, cause the processor to:
       interact with code,
          the code representing a functionality of a block of a model;
       store information regarding a state of the block;
       remove first power to the block,
          the first power being applied to the block at a first time;
       suspend, based on removing the first power to the block, simulation of a behavior of the block;

preserve, based on the suspending the simulation of the behavior of the block, the state of the block;
apply second power to the block,
the second power being applied to the block at a second time, and
the second time occurring after the first time;
resume, based on applying the second power, the simulation of the behavior of the block; and
perform, based on resuming the simulation of the behavior of the block, an operation associated with the block.

16. The medium of claim 15, where the instructions further include:
one or more instructions to receive first information from a user,
the first information including:
second information associated with a condition to be satisfied before simulating the behavior of the block;
one or more instructions to determine that the condition is satisfied; and
one or more instructions to simulate, based on determining that the condition is satisfied, the behavior of the block.

17. The medium of claim 15, where the one or more instructions to preserve the state of the block include:
one or more instructions to preserve a plurality of states of the block,
the plurality of states including at least one volatile state and at least one nonvolatile state.

18. The medium of claim 15, where the one or more instructions to resume the simulation of the behavior of the block include:
one or more instructions to initialize one or more internal states of the block.

19. The medium of claim 15, where the instructions further include:
one or more instructions to simulate, based on applying the first power, the behavior of the block.

20. The medium of claim 15, where the instructions further include:
one or more instructions to generate the code.

* * * * *